United States Patent
Zhang

[11] Patent Number: 6,151,008
[45] Date of Patent: Nov. 21, 2000

[54] METHOD AND APPARATUS FOR CONTROLLING THE BRIGHTNESS OF A DISPLAY SCREEN

[75] Inventor: Tim L. Zhang, Spring, Tex.

[73] Assignee: Compaq Computer Corporation, Houston, Tex.

[21] Appl. No.: 08/905,146

[22] Filed: Aug. 1, 1997

[51] Int. Cl.[7] .......................... G09G 3/36; G02F 1/1335
[52] U.S. Cl. .............................. 345/102; 349/68
[58] Field of Search ................... 345/12, 48, 63, 345/77, 102, 170, 172, 211; 362/27; 340/784; 315/86; 349/68

[56] References Cited

U.S. PATENT DOCUMENTS

| | | | |
|---|---|---|---|
| 4,714,983 | 12/1987 | Lang | 326/27 |
| 5,146,354 | 9/1992 | Plesinger | 359/49 |
| 5,225,822 | 7/1993 | Shiraishi et al. | 340/784 |
| 5,272,327 | 12/1993 | Mitchell et al. | 250/205 |
| 5,295,048 | 3/1994 | Park et al. | 362/26 |
| 5,315,695 | 5/1994 | Saito et al. | 395/132 |
| 5,384,577 | 1/1995 | McLaughlin et al. | 345/102 |
| 5,394,308 | 2/1995 | Watanabe et al. | 362/31 |
| 5,406,305 | 4/1995 | Shimomura et al. | 345/102 |
| 5,709,463 | 1/1998 | Igram | 362/268 |
| 5,796,382 | 8/1998 | Beeteson | 345/102 |
| 5,818,172 | 10/1998 | Lee | 315/86 |
| 5,854,617 | 12/1998 | Lee et al. | 345/102 |
| 5,952,992 | 9/1999 | Helms | 345/102 |

*Primary Examiner*—Vijay Shankar
*Assistant Examiner*—Jeff Piziali
*Attorney, Agent, or Firm*—Akin, Gump, Strauss, Hauer & Feld, LLP

[57] ABSTRACT

A method and apparatus of controlling the brightness level of an LCD display. The brightness of a display having two light bulbs may be controlled by illuminating only one bulb to provide a relatively low brightness level or by illuminating both bulbs to provide a relatively high brightness level. This method and apparatus may be particularly useful in AC/DC powered devices, as a single bulb may be lit when the device is operating on DC power to conserve battery power, and both bulbs may be lit when the device is operating on AC power to provide enhanced brightness.

32 Claims, 4 Drawing Sheets

METHOD AND APPARATUS FOR CONTROLLING THE BRIGHTNESS OF A DISPLAY SCREEN

BACKGROUND OF THE INVENTION

1. Field of the Invention

This invention relates generally to display screens and, more particularly, to a method and apparatus for controlling the brightness of a display screen.

2. Description of the Related Art

Light concentrating diode displays, which are commonly known as LCD displays, have been used for a number of years in a wide variety of applications. LCD displays are probably most commonly used for small digital readouts, such as the digital displays found in watches and calculators. The area of such LCD displays is typically no larger than one square inch. As most people who own a watch or calculator having an LCD display are aware, LCD displays must be illuminated to be viewed in dim lighting. Accordingly, most devices having relatively small LCD displays include a light bulb that effectively illuminates the display so that the user of the device can read the display in dimly lit environments.

LCD displays have become increasingly larger in size and, thus, are being used in applications much more complex than providing a simple digital readout. For example, LCD displays are currently a popular choice for desktop computers, portable computers, personal information organizers, and the like. The area of these relatively large displays is typically greater than five square inches, and these displays may be larger than 100 square inches. Because of their relatively large size, these displays cannot be effectively illuminated using only one light bulb positioned to shine on or behind the display. Rather, such a technique, which was used with early large LCD displays, creates a bright portion, sometimes referred to as a "hot spot," on the display. The bright portion may be so bright as to "wash out" any characters or information contained on that portion of the display, while the remaining portion of the display may be too dark to read.

To solve this problem, elongated light bulbs have been developed in conjunction with diffusion screens. In a typical arrangement used for AC powered devices, a first elongated light bulb is placed at the top of an LCD display and a second elongated light bulb is placed at the bottom of the LCD display. A diffusion screen is placed behind the LCD display between the first and second light bulbs. This type of diffusion screen is a single sheet of plastic that has reflectors formed in it. These reflectors get progressively larger toward the center of the diffusion screen. To illuminate the LCD display, both light bulbs are illuminated, and the light from each bulb is diffused by the diffusion screen to provide a relatively consistent brightness level over the entire area of the LCD display.

By contrast, in a typical arrangement used for DC and AC/DC powered devices, a single elongated light bulb is placed at the top of an LCD display, and a diffusion screen is placed behind the LCD display below the light bulb. This type of diffusion screen is also a single sheet of plastic that has reflectors formed in it. However, unlike the previously discussed diffusion screen, these reflectors get progressively larger toward the bottom of the diffusion screen. To illuminate the LCD display, the light bulb is illuminated, and the light from the single bulb is diffused by the diffusion screen to provide a relatively consistent brightness level over the entire area of the LCD display.

It should be understood that single light bulbs are used in DC and AC/DC powered devices to conserve battery power when the LCD display is being illuminated, because a single light bulb consumes less power than two light bulbs. However, as compared with the LCD displays used in AC powered devices that use two light bulbs, the LCD displays used in DC and AC/DC powered devices suffer from the reduced brightness levels produced by the single light bulb. This disadvantage remains even if an AC/DC powered device is operating on AC power, because the device contains only a single light bulb.

The present invention is directed to addressing one or more of the matters set forth above.

SUMMARY OF THE INVENTION

In accordance with one aspect of the present invention, there is provided an apparatus for controlling a display screen's brightness. The apparatus includes a first light bulb and a second light bulb positioned in spaced apart relation to the first light bulb. A diffusion screen is positioned in operable relation to the first light bulb and the second light bulb. A control circuit is coupled to the first light bulb and the second light bulb. The control circuit illuminates one of the first light bulb and the second light bulb in response to a first condition and illuminates both the first light bulb and the second light bulb in response to a second condition.

In accordance with another aspect of the present invention, there is provided an apparatus for controlling a display screen's brightness. The apparatus includes a first light bulb positioned behind the display screen and adjacent a top edge of the display screen, and a second light bulb positioned behind the display screen and adjacent a bottom edge of the display screen. A diffusion screen is positioned behind the display screen between the first light bulb and the second light bulb. A control circuit is coupled to the first light bulb and the second light bulb. The control circuit illuminates one of the first light bulb and the second light bulb in response to a first condition and illuminates both the first light bulb and the second light bulb in response to a second condition.

In accordance with still another aspect of the present invention, there is provided an AC/DC powered device that includes a display screen having a top edge and a bottom edge. A first light bulb is positioned behind the display screen and adjacent the top edge of the display screen, and a second light bulb is positioned behind the display screen and adjacent the bottom edge of the display screen. A diffusion screen is positioned behind the display screen between the first light bulb and the second light bulb. A control circuit is coupled to the first light bulb and the second light bulb. The control circuit illuminates only the first light bulb during DC operation of the device and illuminates both the first light bulb and the second light bulb during AC operation of the device.

In accordance with yet another aspect of the present invention, there is provided a method of controlling a display's brightness. The display has a display screen, a diffusion screen positioned behind the display screen, a first light bulb, and a second light bulb, wherein the first and second light bulbs are positioned behind the display screen in operable relation to the diffusion screen. The method includes the steps of: (a) illuminating only the first light bulb in response to a first condition; and (b) illuminating the first light bulb and the second light bulb in response to a second condition.

In accordance with a further aspect of the present invention, there is provided a method of controlling a display's brightness. The method includes the steps of: (a)

providing a display screen; (b) positioning a diffusion screen behind the display screen; (c) positioning a first light bulb and a second light bulb behind the display screen in operable relation to the diffusion screen; (d) illuminating the first light bulb in response to a first condition; and (e) illuminating the first light bulb and the second light bulb in response to a second condition.

In accordance with an even further aspect of the present invention, there is provided a method of operating an AC/DC powered device. The device has a display. The display has a display screen, a diffusion screen positioned behind the display screen, a first light bulb, and a second light bulb, wherein the first and second light bulbs are positioned behind the display screen in operable relation to the diffusion screen. The method includes the steps of: (a) illuminating the first light bulb in response to a first condition; and (b) illuminating the first light bulb and the second light bulb in response to a second condition.

In accordance with a still further aspect of the present invention, there is provided an AC/DC powered device that includes a display. The display has a display screen, a diffusion screen positioned behind the display screen, a first light bulb, and a second light bulb. The first and second light bulbs are positioned behind the display screen in operable relation to the diffusion screen. There is also provided means for illuminating the first light bulb in response to a first condition and means for illuminating the first light bulb and the second light bulb in response to a second condition.

In accordance with a yet further aspect of the present invention, there is provided an AC/DC powered device that includes means for displaying information, means for illuminating the displaying means at a first brightness level during DC operation of the device, and means for illuminating the displaying means at a second brightness level higher than the first brightness level during AC operation of the device.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
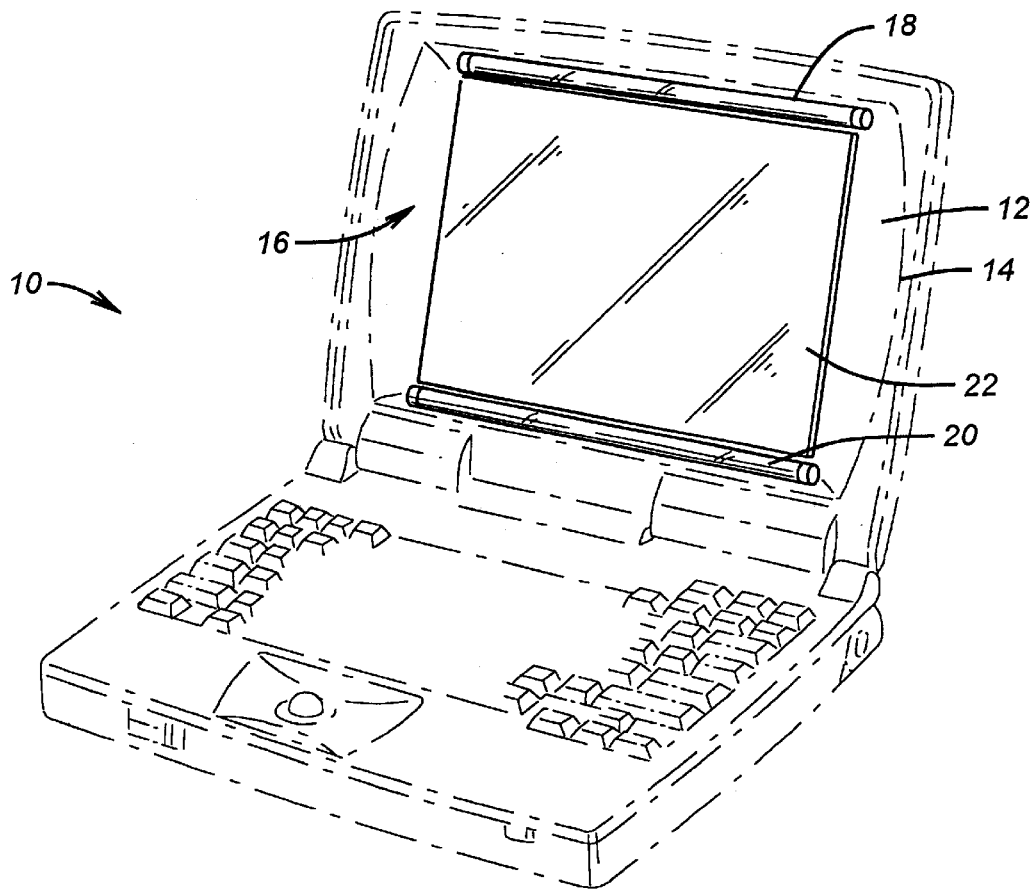
FIG. 1 illustrates a laptop computer as an example of an AC/DC powered device having a relatively large LCD display.

Turning now to the drawings, and referring initially to FIG. 1, an AC/DC powered device having an illuminated LCD display is illustrated and generally designated by a reference numeral 10. The device 10 is shown to be a laptop computer, but a variety of other AC/DC powered devices, such as hand-held computers, cellular telephones, personal organizers, and the like, may also benefit from the teachings disclosed herein.

The LCD display 12 is shown by the phantom lines 14. An arrangement for illuminating the LCD display 12, designated generally by the reference numeral 16, is placed behind the LCD display 12. The arrangement 16 includes an upper light bulb 18, a lower light bulb 20, and a diffusion screen 22 positioned between the upper light bulb 18 and the lower light bulb 20. When the device 10 is operating on AC power, both the upper light bulb 18 and the lower light bulb 20 are illuminated to provide a level of brightness commensurate with a typical device, such as a desk top computer, that operates solely on AC power. However, when the device 10 is operating on DC power, only the upper light bulb 18 is illuminated to conserve battery power. Accordingly, the brightness of the LCD display 12 is lower when the device 10 is being powered by its battery, as opposed to when the device 10 is plugged into a wall outlet.

Figure 2:
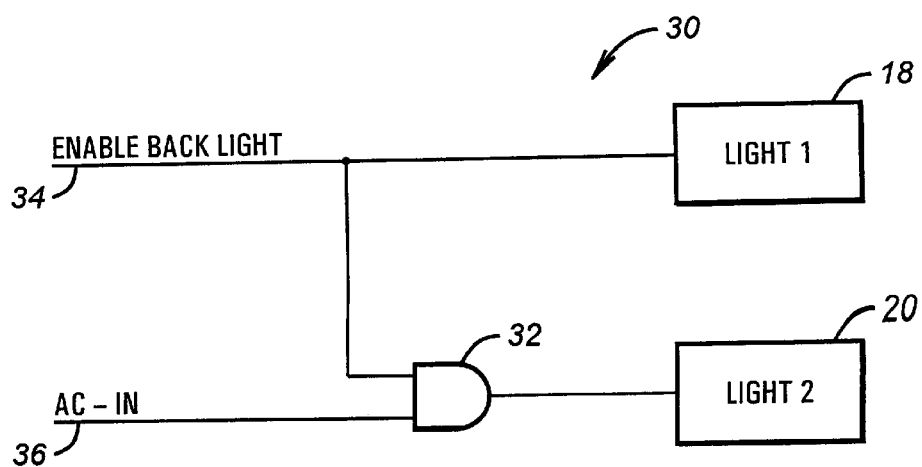
FIG. 2 illustrates a schematic diagram of a circuit for controlling the brightness level of an LCD display in accordance with the present invention.

A circuit for controlling the brightness level of the LCD display 12 is illustrated in FIG. 2 and generally designated by a reference numeral 30. The circuit 30 includes an AND gate 32, or its equivalent. The AND gate 32 receives an "enable back light" signal on line 34 and an "AC-IN" signal on line 36. The upper light bulb 18 is coupled to the line 34, and the lower light bulb 20 is coupled to the output of the AND gate 32. Accordingly, the upper light bulb 18 lights whenever the "enable back light" signal is present, but the lower light bulb 20 lights only when both the "enable back light" signal and the "AC-IN" signal are present. In other words, the lower light bulb 20 does not illuminate unless the device 10 is operating using AC power. It should be noted that the lower light bulb 20 could be illuminated when the device 10 operates under DC power. However, the rising heat from the lower light bulb 20 may adversely affect the LCD display 12, so the other method is preferred.

The "enable back light" signal may be produced by the device 10 in a variety of ways. For instance, the device 10 may include a switch (not shown) that may be used to initiate illumination of the LCD display. Such a switch may be set at the user's discretion, or the switch may be coupled to a moveable portion of the device 10, such as a folding lid, so that the switch generates the "enable back light" signal whenever the moveable portion is placed in a given position. Alternatively, the "enable back light" signal may be generated internally by the device 10 whenever the device 10 is turned on, e.g. it could be generated by a graphics controller in the device 10 during the power up sequence. As a further alternative, the device 10 may include a light intensity sensor (not shown) that generates the "enable back light" signal in response to environmental light conditions dropping below a prescribed level.

Similarly, the "AC-IN" signal may also be produced by the device 10 in a variety of ways. For instance, the device 10 may include an AC-DC switch (not shown) that is set to one position or the other depending upon the source currently powering the device 10. Alternatively, the "AC-IN" signal may be produced automatically when the device 10 is plugged into a wall outlet or when it otherwise begins to operate using AC power. For example, the device 10 may include a DC-to-DC converter (not shown) that produces one voltage level when AC power is present and another voltage level when AC power is not present.

Although the circuit 30 may be used to illuminate one or both of the light bulbs 18 and 20 selectively depending upon whether the device 10 is operating on DC or AC power, respectively, it should be noted that the diffusion screen 22 is responsible for providing a relatively consistent brightness level over the area of the LCD display 12 regardless of whether one or both of the light bulbs 18 and 20 is illuminated. However, before discussing the diffusion screen 22, it may be useful to discuss the types of diffusion screens used in convention dual bulb and single bulb arrangements.

Figure 3:
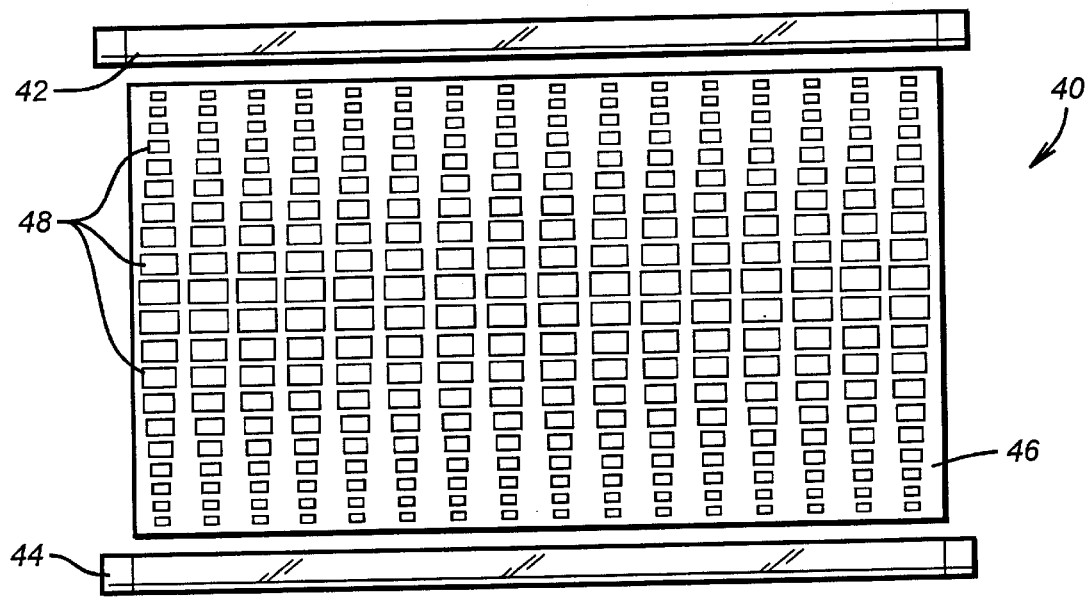
FIG. 3 illustrates a dual light bulb and diffusion screen arrangement used in the prior art by an AC powered device.

A conventional dual bulb arrangement, such as is typically used in an AC powered device, is illustrated in FIG. 3 and generally designated by the reference numeral 40. The dual bulb arrangement 40 includes an upper light bulb 42 and a lower light bulb 44. A diffusion screen 46 is positioned between the upper light bulb 42 and the lower light bulb 44. In this conventional arrangement 40, both bulbs 42 and 44 are either on or off at the same time. Accordingly, the diffusion screen 46 is designed to provide a relatively consistent brightness level across its area when both light bulbs 42 and 44 are illuminated.

To diffuse the light from each bulb 42 and 44 in this manner, the diffusion screen 46 includes a plurality of reflectors 48 that are typically arranged in rows and columns. As can be seen from this illustration, the reflectors 48 are smaller near the respective light bulbs 42 and 44 and become larger further from the light bulbs 42 and 44. Accordingly, the reflectors 48 are largest in the center of the diffusion screen 46 and smallest near the edges.

It should be appreciated that the diffusion screen 46 would not produce a consistent brightness level over its entire area if only one of the light bulbs 42 or 44 were illuminated. Rather, the brightness level would be fairly consistent and satisfactory over about one half of the diffusion screen 46, with the other half of the diffusion screen 46 being quite dark. Accordingly, the diffusion screen 46 would, in and of itself, likely be unsuitable for use with the arrangement 16 described above.

Figure 4:
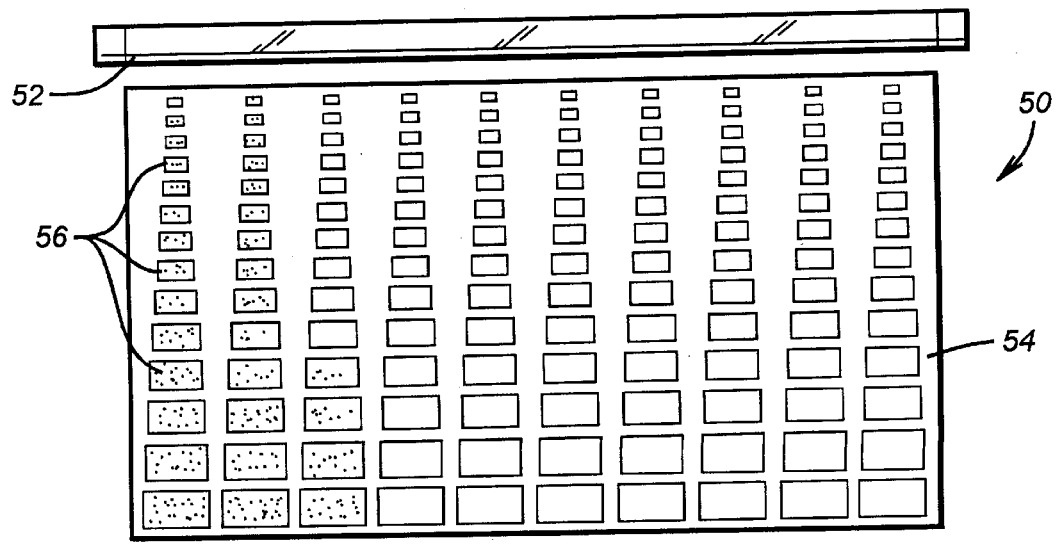
FIG. 4 illustrates a single light bulb and diffusion screen arrangement used in the prior art by an AC/DC or DC powered device.

A conventional single bulb arrangement, such as is typically used in an AC/DC or DC powered device, is illustrated in FIG. 4 and generally designated by the reference numeral 50. The single bulb arrangement 50 includes only an upper light bulb 52. A diffusion screen 54 is positioned below the upper light bulb 52. In this conventional arrangement 50, the bulb 52 is illuminated regardless of whether its associated device is operating off of AC power or DC power. Accordingly, the diffusion screen 54 is designed to provide a relatively consistent brightness level across its area when the single light bulb 52 is illuminated.

To diffuse the light from the single bulb 52 in this manner, the diffusion screen 54 includes a plurality of reflectors 56 that are typically arranged in rows and columns. As can be seen from this illustration, the reflectors 56 are smaller near the light bulb 52 and become larger further from the light bulb 52. Accordingly, the reflectors 56 are largest near the bottom edge of the diffusion screen 54 and smallest near the upper edge of the diffusion screen 54.

It should be appreciated that the diffusion screen 54 would not produce a consistent brightness level over its entire area if two light bulbs—one positioned at the top of the screen 54 and one positioned at the bottom of the screen 54—were illuminated. Rather, the lower light bulb (not shown) would produce a "hot spot" near the bottom of the diffusion screen 54, because the diffusion screen 54 would not transfer the light from the lower bulb upwardly with much efficiency. Accordingly, similar to the diffusion screen 46, the diffusion screen 54 would, in and of itself, likely be unsuitable for use with the arrangement 16 described above.

Figure 5:
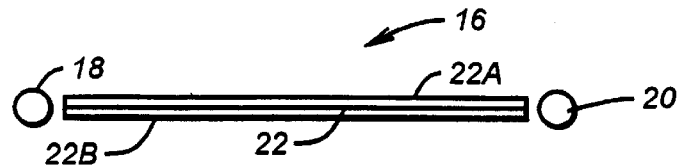
FIG. 5 illustrates a side view of one embodiment of a light bulb and diffusion screen arrangement in accordance with the present invention.
Figure 6:
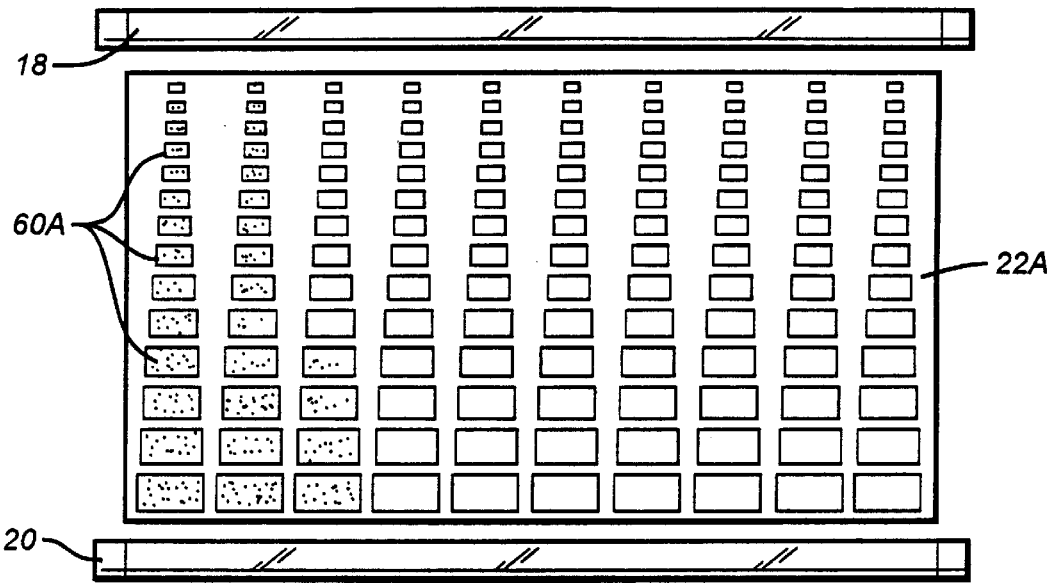
FIG. 6 illustrates a top view (rotated by 90 degrees) of the light bulb and diffusion screen arrangement of FIG. 5.
Figure 7:
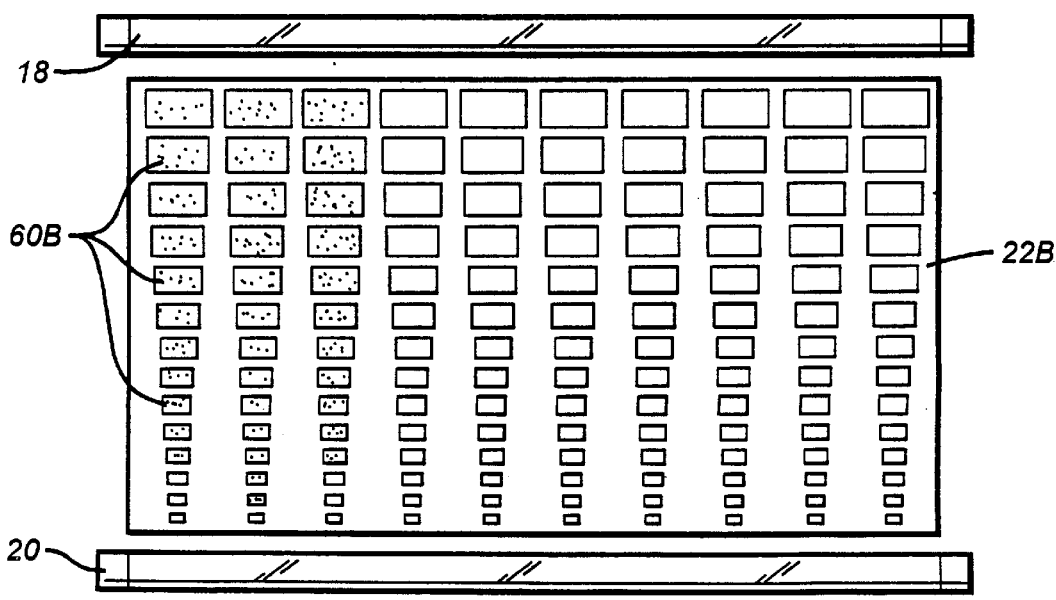
FIG. 7 illustrates a bottom view (rotated by 90 degrees) of the light bulb and diffusion screen arrangement of FIG. 5.

In view of the deficiencies described above, the diffusion screen 22 is designed to provide relatively uniform brightness levels across the entire area of the LCD display 12 regardless of whether one or both light bulbs 18 and 20 are illuminated. Referring now to FIGS. 5–8, a first embodiment of the arrangement 16 will now be described. As illustrated by the side view in FIG. 5, the diffusion screen 22 includes a first half screen 22A and a second half screen 22B. Each of the half screens 22A and 22B is similar to the diffusion screen 54 that is used with only a single light bulb. In contrast, however, the half screens 22A and 22B are positioned in a complimentary fashion. Specifically, the reflectors 60A of the first half screen 22A are smallest near the upper light bulb 18 and become larger toward the lower light bulb 20, as illustrated in FIG. 6. The reflectors 60B of the second half screen 22B are the smallest near the lower light bulb 20 and become larger toward the upper light bulb 18, as illustrated in FIG. 7.

Because of this positioning, each half screen 22A and 22B provides uniform brightness for its respective light bulb 18 and 20. When the device 10 is operating under DC power so that only the upper light bulb 18 is illuminated, the first half screen 22A provides a relatively low, but consistent, brightness level over the entire area of the LCD display 12. When the device 10 is operating under AC power so that both the upper and lower light bulbs 18 and 20 are illuminated, each half screen 22A and 22B diffuses the light emitted from its respective bulb 18 and 20 to provide a relatively high, and consistent, brightness level over the entire area of the LCD display 12.

Figure 8:
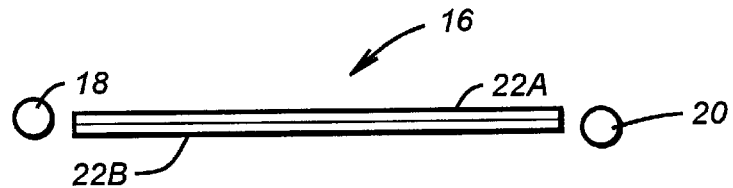
FIG. 8 illustrates an alternate side view of the embodiment of a light bulb and diffusion screen arrangement of FIG. 6 and FIG. 7.
Figure 9:
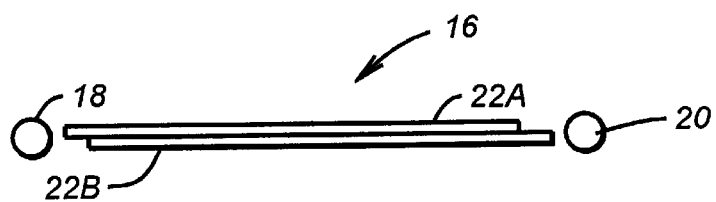
FIG. 9 illustrates another alternate side view of the embodiment of a light bulb and diffusion screen arrangement of FIG. 6 and FIG. 7.

The various alternatives described below may be used alone or in combination to reduce the possibility of creating a "hot spot" on the upper or lower portions of the LCD display 12. For instance, the edge of each half screen 22A and 22B near the large reflectors may be coated with a light absorbing or reflective material to prevent light transmission into that end of the half screens 22A and 22B. Alternatively, the upper light bulb 18 and the lower light bulb 20 may be slightly offset toward the first half screen 22A and the second half screen 22B, respectively, as illustrated in FIG. 8, rather than positioned in line with the diffusion screen 22, as illustrated in FIG. 5. This slight offset reduces the interaction between the upper light bulb 18 and the second half screen 22B and reduces the interaction between the lower light bulb 20 and the first half screen 22A. This reduced interaction diminishes the possibility of creating a "hot spot" near the top or bottom of the LCD display 12. As a further alternative, the end of each half screen 22A and 22B containing the small reflectors may be placed closer to its associated light bulb 18 and 20, respectively, as illustrated in FIG. 9, to reduce light transmission into the end of each half screen containing the large reflectors.

Figure 10:
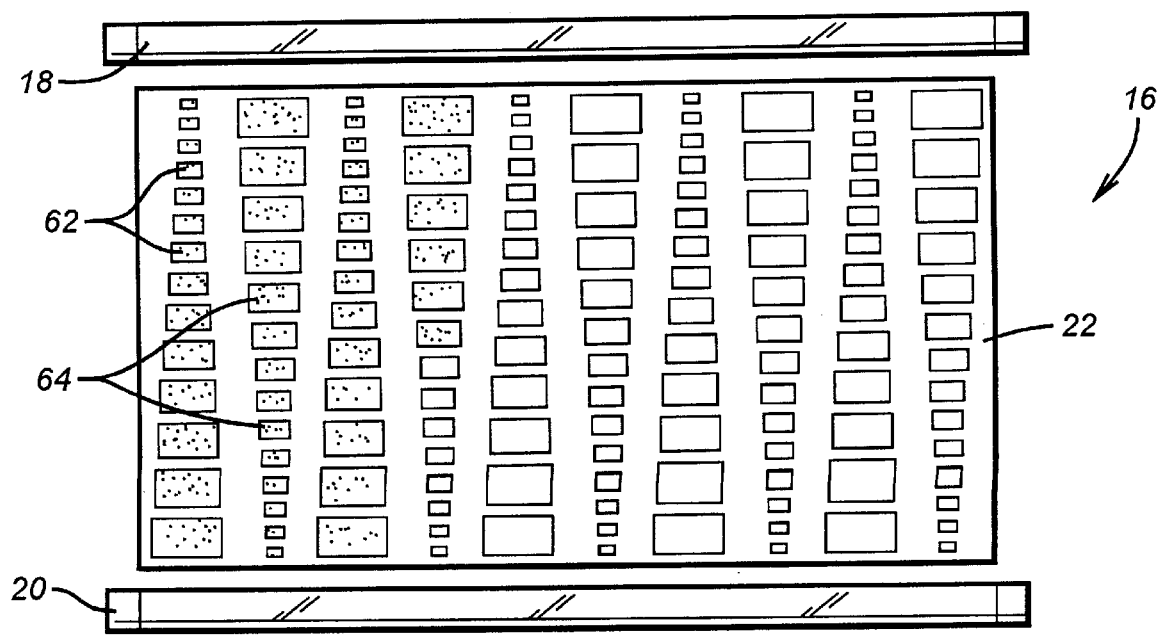
FIG. 10 illustrates an alternate embodiment of a light bulb and diffusion screen arrangement in accordance with the present invention.

A second embodiment of the arrangement 16 is illustrated in FIG. 10. Unlike the previous embodiment, the diffusion screen 22 in this embodiment does not contain two half screens. In this embodiment, the diffusion screen 22 contains a plurality of reflectors 62 and 64 that are arranged generally in rows and columns. The reflectors 62 are small near the upper light bulb 18 and become larger as they extend toward the lower light bulb 20. Conversely, the reflectors 64 are large near the upper light bulb 18 and become smaller as they extend toward the lower light bulb 20. In use, the columns of reflectors 62 diffuse the light emitted from the upper light bulb 18 across the screen 22, and the columns of reflectors 64 diffuse the light emitted from the lower light bulb 20 across the screen 22. Accordingly, when only the upper light bulb 18 is illuminated, the diffusion screen 22 provides a relatively low, but consistent, brightness level over the entire area of the LCD display 12, and when both light bulbs 18 and 20 are illuminated, the diffusion screen 22 provides a relatively high, and consistent, brightness level over the entire area of the LCD display 12.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus for controlling a display screen's brightness, the apparatus comprising:
    a first light bulb;
    a second light bulb positioned in spaced apart relation to the first light bulb;
    a diffusion screen positioned in operable relation to the first light bulb and the second light bulb, the diffusion screen providing a relatively consistent brightness level over its entire surface during illumination of one of the first light bulb and the second light bulb and during illumination of both the first light bulb and the second light bulb; and
    a control circuit coupled to the first light bulb and the second light bulb, the control circuit illuminating one of the first light bulb and the second light bulb in response to a first condition and illuminating both the first light bulb and the second light bulb in response to a second condition.

2. The apparatus, as set forth in claim 1, wherein the display screen is a liquid crystal display.

3. The apparatus, as set forth in claim 1, wherein the first light bulb and the second light bulb are elongated.

4. The apparatus, as set forth in claim 1, wherein the control circuit receives a first signal correlative to illuminating at least one of the first light bulb and the second light bulb and receives a second signal correlative to whether AC power is available, the first condition corresponding to receipt of only the first signal, and the second condition corresponding to receipt of both the first signal and the second signal.

5. The apparatus, as set forth in claim 4, wherein the control circuit comprises an AND gate, the AND gate having inputs coupled to receive the first signal and the second signal, the first light bulb being responsive to the first signal and the second light bulb being responsive to an output of the AND gate.

6. An apparatus for controlling a display screen's brightness, the apparatus comprising:
    a first light bulb positioned behind the display screen and adjacent a top edge of the display screen;
    a second light bulb positioned behind the display screen and adjacent a bottom edge of the display screen;
    a diffusion screen positioned behind the display screen between the first light bulb and the second light bulb, the diffusion screen providing a relatively consistent brightness level over its entire surface during illumination of one of the first light bulb and the second light bulb and during illumination of both the first light bulb and the second light bulb; and
    a control circuit coupled to the first light bulb and the second light bulb, the control circuit illuminating one of the first light bulb and the second light bulb in response to a first condition and illuminating both the first light bulb and the second light bulb in response to a second condition.

7. The apparatus, as set forth in claim 6, wherein the display screen is a liquid crystal display.

8. The apparatus, as set forth in claim 6, wherein the first light bulb and the second light bulb are elongated.

9. The apparatus, as set forth in claim 6, wherein the control circuit receives a first signal correlative to illuminating at least one of the first light bulb and the second light bulb and receives a second signal correlative to whether AC power is available, the first condition corresponding to receipt of only the first signal, and the second condition corresponding to receipt of both the first signal and the second signal.

10. The apparatus, as set forth in claim 9, wherein the control circuit comprises an AND gate, the AND gate having inputs coupled to receive the first signal and the second signal, the first light bulb being responsive to the first signal and the second light bulb being responsive to an output of the AND gate.

11. An AC/DC powered device comprising:
    a display screen having a top edge and a bottom edge;
    a first light bulb positioned behind the display screen and adjacent the top edge of the display screen;
    a diffusion screen positioned behind the display screen between the first light bulb and the second light bulb, the diffusion screen providing a relatively consistent brightness level over its entire surface during illumination of one of the first light bulb and the second light bulb and during illumination of both the first light bulb and the second light bulb; and
    a control circuit coupled to the first light bulb and the second light bulb, the control circuit illuminating only the first light bulb during DC operation of the device and illuminating both the first light bulb and the second light bulb during AC operation of the device.

12. The device, as set forth in claim 11, wherein the device comprises a portable computer.

13. The device, as set forth in claim 11, wherein the display screen is a liquid crystal display.

14. The device, as set forth in claim 11, wherein the first light bulb and the second light bulb are elongated.

15. The device, as set forth in claim 11, wherein the control circuit receives a first signal correlative to illuminating at least one of the first light bulb and the second light bulb and receives a second signal correlative to whether AC power is available, DC operation of the device corresponding to receipt of only the first signal, and the AC operation of the device corresponding to receipt of both the first signal and the second signal.

16. The device, as set forth in claim 15, wherein the control circuit comprises an AND gate, the AND gate having inputs coupled to receive the first signal and the second signal, the first light bulb being responsive to the first signal and the second light bulb being responsive to an output of the AND gate.

17. A method of controlling a display's brightness, the display having a display screen, a diffusion screen positioned behind the display screen, a first light bulb, and a second light bulb, wherein the first and second light bulbs are positioned behind the display screen in operable relation to the diffusion screen, the method comprising the steps of:

illuminating only the first bulb in response to a first condition;

illuminating the first light bulb and the second light bulb in response to a second condition; and providing a relatively consistent brightness level over the entire surface of the diffusion screen during illumination of one of the first light bulb and the second light bulb and during illumination of both the first light bulb and the second light bulb.

18. The method, as set forth in claim 17, wherein step (a) comprises the step of illuminating the first bulb in response to the first condition indicating DC operation of a device using the display.

19. The method, as set forth in claim 17, wherein step (b) comprises the step of illuminating the first bulb and the second bulb in response to the second condition indicating AC operation of a device using the display.

20. The method of claim 17, wherein the step of illuminating the first light bulb in response to a first condition comprises illuminating the first light bulb in response to a first condition representing availability of DC power and wherein the step of illuminating the first light bulb and the second light bulb in response to a second condition comprises illuminating the first light bulb and the second light bulb in response to a second condition representing availability of AC power.

21. A method of controlling a display's brightness, the method comprising the steps of:

providing a display screen;

positioning a diffusion screen behind the display screen;

positioning a first light bulb and a second light bulb behind the display screen in operable relation to the diffusion screen, the diffusion screen providing a relatively consistent brightness level over its entire surface during illumination of one of the first light bulb and the second light bulb and during illumination of both the first light bulb and the second light bulb;

illuminating the first light bulb in response to a first condition; and illuminating the first light bulb and the second light bulb in response to a second condition.

22. The method, as set forth in claim 21, wherein step (d) comprises the step of illuminating the first bulb in response to the first condition indicating DC operation of a device using the display.

23. The method, as set forth in claim 21, wherein step (e) comprises the step of illuminating the first bulb and the second bulb in response to the second condition indicating AC operation of a device using the display.

24. An AC/DC powered device comprising:

a display, the display having a display screen, a diffusion screen positioned behind the display screen, a first light bulb, and a second light bulb, the first and second light bulbs being positioned behind the display screen in operable relation to the diffusion screen;

means for providing a relatively consistent brightness level over its entire surface during illumination of one of the first light bulb and the second light bulb and during illumination of both the first light bulb and the second light bulb;

means for illuminating the first light bulb in response to a first condition; and means for illuminating the first light bulb and the second light bulb in response to a second condition.

25. The device, as set forth in claim 24, wherein the display screen is a liquid crystal display.

26. The device, as set forth in claim 24, wherein the first light bulb and the second light bulb are elongated.

27. A computer system comprising:

a computer;

a display screen operably coupled to said computer, said display screen comprising a first light bulb, and a second light bulb positioned in spaced apart relation to the first light bulb, and a diffusion screen positioned in operable relation to the first light bulb and the second light bulb, the diffusion screen providing a relatively consistent brightness level over its entire surface during illumination of one of the first light bulb and the second light bulb and during illumination of both the first light bulb and the second light bulb; and a control circuit coupled to the computer and coupled to the first light bulb and the second light bulb, the control circuit illuminating one of the first light bulb and the second light bulb in response to a fist condition and illuminating both the first light bulb and the second light bulb in response to a second condition.

28. The computer system, as set forth in claim 27, wherein said computer comprises a DC-to-DC converter that produces a first signal when AC power is not available and a second signal when AC power is available, said first signal corresponding to said first condition and said second signal corresponding to said second condition.

29. The computer system, as set forth in claim 27, wherein the display screen is a liquid crystal display.

30. The computer system, as set forth in claim 27, wherein the first light bulb and the second light bulb are elongated.

31. The computer system, as set forth in claim 27, wherein the control circuit receives a first signal correlative to illuminating at least one of the first light bulb and the second light bulb and receives a second signal correlative to whether AC power is available, the first condition corresponding to receipt of only the first signal, and the second condition corresponding to receipt of both the first signal and the second signal.

32. The computer system, as set forth in claim 31, wherein the control circuit comprises an AND gate, the AND gate having inputs coupled to receive the first signal and the second signal, the first light bulb being responsive to the first signal and the second light bulb being responsive to an output of the AND gate.

* * * * *